United States Patent [19]

Kita et al.

[11] Patent Number: 5,009,852
[45] Date of Patent: Apr. 23, 1991

[54] COOLED FLUIDIZATION GRID

[75] Inventors: Jean-Claude Kita, Vermelles; Roger M. Puff, Lens; Alexandre Petrovic, Chatou; Marcel Chretien, Morsang-sur-Orge, all of France

[73] Assignee: Charbonnages de France, Malmaison Cedex, France

[21] Appl. No.: 281,157

[22] Filed: Dec. 8, 1988

[30] Foreign Application Priority Data

Dec. 11, 1987 [FR] France ................. 87 17314

[51] Int. Cl.[5] ........................... B01J 8/44
[52] U.S. Cl. ............... 422/143; 165/104.16; 422/146
[58] Field of Search ........... 422/142, 143, 146; 134/57 A; 122/4 D; 165/104.16

[56] References Cited

U.S. PATENT DOCUMENTS

| | | | |
|---|---|---|---|
| 2,536,099 | 1/1951 | Schleicher | 422/146 |
| 2,620,262 | 12/1952 | Hujsak et al. | 422/146 |
| 3,016,624 | 1/1962 | Bliss | |
| 3,833,051 | 9/1974 | Fink | 422/146 |
| 3,908,289 | 9/1975 | Beranek et al. | 165/104.16 |
| 4,418,650 | 12/1983 | Johnson et al. | 34/57 A |
| 4,442,888 | 4/1984 | Kuwata | 422/146 |
| 4,466,385 | 8/1984 | Waryasz | 165/104.16 |
| 4,628,831 | 12/1986 | Delessard et al. | 34/57 A |
| 4,674,564 | 6/1987 | Chrysostome et al. | 422/146 |

FOREIGN PATENT DOCUMENTS

| | | | |
|---|---|---|---|
| 378591 | 8/1985 | Austria . | |
| 0019652 | 12/1980 | European Pat. Off. . | |
| 0195436 | 9/1986 | European Pat. Off. | 160/104.16 |
| 2582540 | 12/1986 | France . | |
| 2075360 | 11/1981 | United Kingdom | 422/311 |
| 2182578 | 5/1987 | United Kingdom . | |

*Primary Examiner*—Peter Kratz
*Attorney, Agent, or Firm*—Cushman, Darby & Cushman

[57] ABSTRACT

The fluidizing grid of the invention is essentially constituted by pipes (18) forming the diverging walls of the openings (17) through which the fluidizing air is blown. These pipes have a cooling liquid (water) flowing therealong, which water then flows through the heat exchange tubes of the boiler.

6 Claims, 4 Drawing Sheets

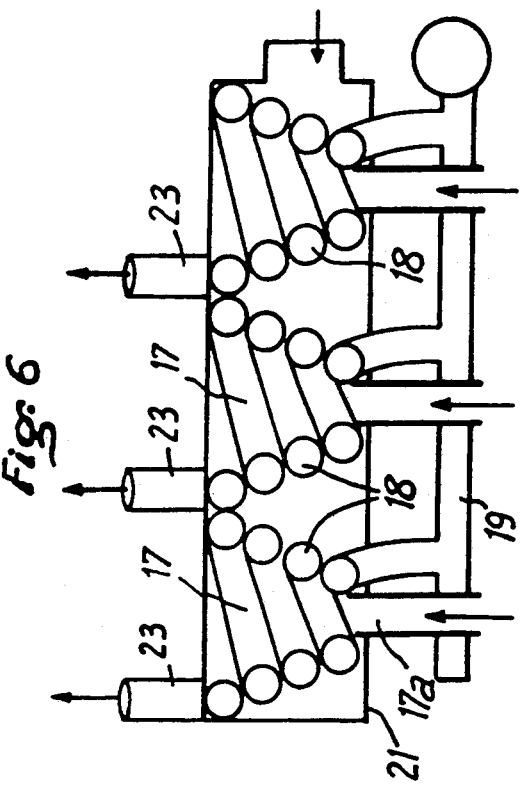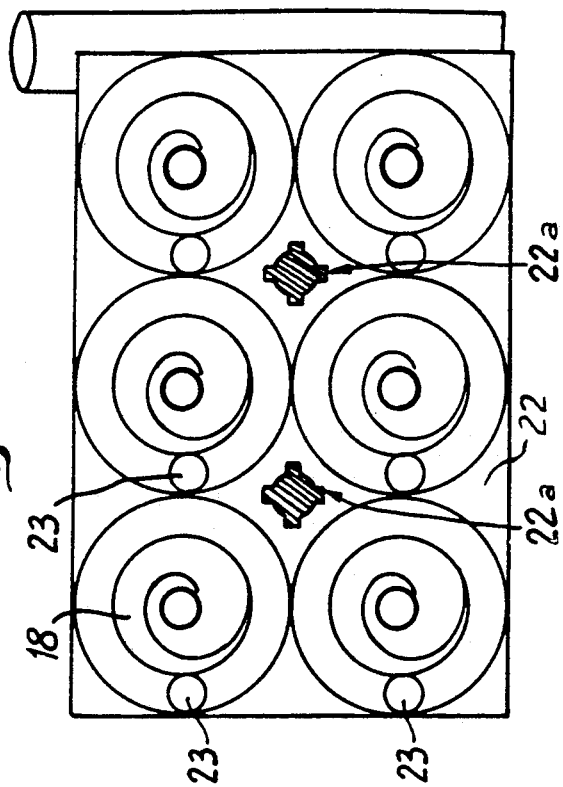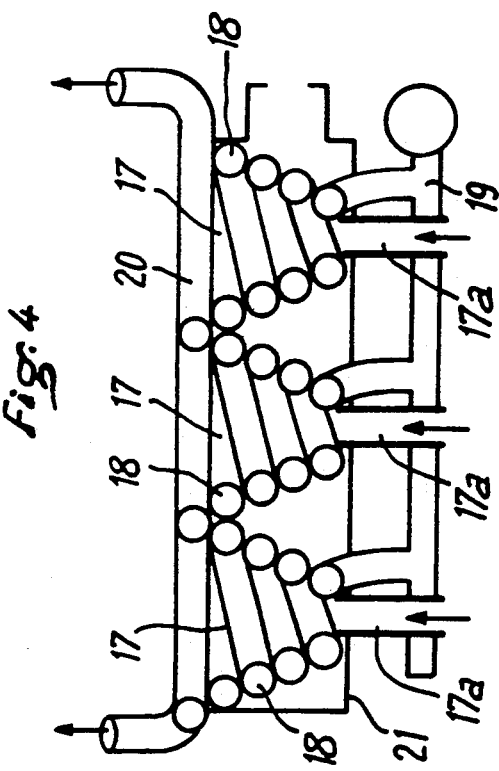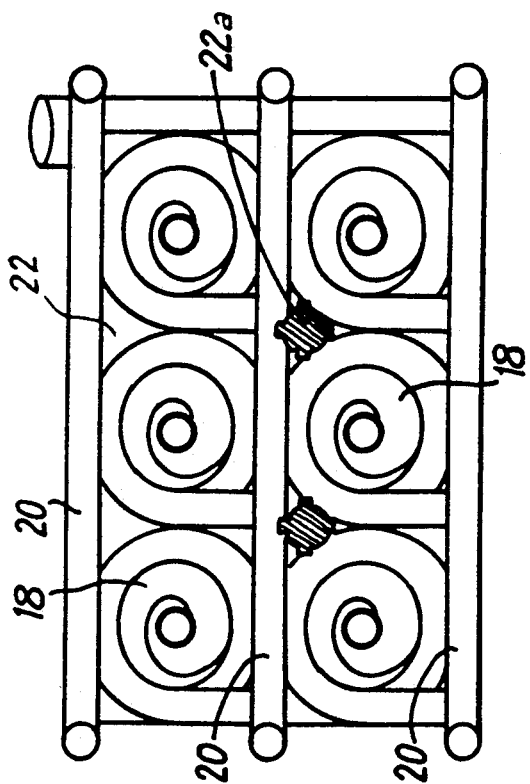

COOLED FLUIDIZATION GRID

BACKGROUND OF THE INVENTION

The techniques of fluidizing a particulate material are well known and are advantageously applicable in boilers or more generally in enclosures for exothermic reactions. In this particular application, the heat released by the reaction or the combustion needs to be extracted as effectively as possible. Such heat extraction is generally performed by means of a heat exchanger, generally comprising a bundle of tubes having water under pressure flowing therein, with the water being turned into steam, with the heat exchanger extending over the walls of the hearth and/or through the fluidized bed itself in privileged zones thereof where corrosion and erosion conditions are judged to be relatively small. These tubes are thus situated over the fluidization grid which, in conventional manner, includes upwardly diverging openings through which the fluidizing gas (generally air) is blown, and further openings may be provided for admitting additional air. These further openings are placed at the top of small flues interposed between the diverging openings and the air which they deliver is directed generally horizontally or downwardly by means of deflectors or by virtue of special dispositions of the distribution orifices.

Fluidization grids are also known which include cooling tubes in contact with the fluidized bed. However, such grids are generally plane and do not have the advantages of grids having divergent gas-blowing openings.

The present invention seeks to provide a considerable improvement to this type of fluidized bed reactor, having a cooled grid in which the gas-blowing openings are divergent, thereby making control of the temperature within the fluidized bed easier than is possible using heat exchangers placed in the bed and which therefore wear very rapidly, the invention also makes it possible to heat the additional fluidizing air while simultaneously cooling the grid, thereby increasing its length of life.

SUMMARY OF THE INVENTION

To this end, the present invention provides a grid for fluidizing a mass of finely divided material in a fluidized bed exothermal reactor, the grid comprising adjacent openings for admitting a gas for sustaining said material which is situated over the top face of a wall having said openings passing through the thickness thereof, said openings diverging in the direction of the mass to be fluidized, wherein the diverging walls of each opening include pipes for conveying the flow of a cooling fluid.

In a first embodiment of the invention, the grid is constituted by superposing layers of parallel pairs of tubes, with the tubes in each layer crossing the tubes in the adjacent layer and with the spacing between the pairs of tubes in each layer increasing with increasing height of the layer within the grid.

Any crossing angle may be used, but if an angle of 90° is used it is then possible to constitute pyramid-shaped openings having square or rectangular bases. Within the scope of the invention, it is also possible to provide a crossing angle of 120°, in which case the pyramid-shaped openings can have hexagonal bases.

In order to make the grid airtight apart from its openings for admitting fluidization air, the walls of each pyramid-shaped cell constituted in this way are materialized between the parallel tubes of two different layers by connection plates which are welded to the tubes interconnecting them via their closest generator lines. Further, in the particular case of a grid having square based pyramid-shaped cells, the adjacent tubes of two consecutive pairs in the top layer may be interconnected by connection plates or may coincide, whereas the corresponding tubes of the layer immediately below are interconnected by horizontal connection plates.

In different variants of this first embodiment, the layers of tubes may be connected to peripheral ducts constituting a fluid distributor or manifold, or else the tubes may be directly connected to the heat exchange tubes which conventionally line the wall of the reactor or boiler enclosure.

In a second embodiment, the grid is constituted by juxtaposing flared cells each having a wall constituted by at least one helical winding of contiguous turns. Each of the cells is connected to one of its neighbors by plates which are welded substantially in the plane of the largest sections of the cells.

In this embodiment, it is also possible to provide a network of parallel manifolds on the top surface of the grid, with the downstream end of each of the pipes being connected to the network of manifolds, with the manifolds themselves being connected at each of their ends to common ducts from which the tubes of the heat exchangers extend vertically along the walls of an enclosure confining the fluidized bed, or else each pipe may be connected at its down- stream end to a vertical heat exchange tube.

BRIEF DESCRIPTION OF THE DRAWINGS

Embodiments of the invention are described by way of example with reference to the accompanying drawings, in which:

FIG. 4 is a diagram in section of a second embodiment of a grid in accordance with the invention;

FIG. 5 is a diagrammatic plan view of FIG. 4;

FIG. 6 is a section through a variant of FIG. 4;

FIG. 7 is a diagrammatic plan view of said variant; and

MORE DETAILED DESCRIPTION

Figure 1:
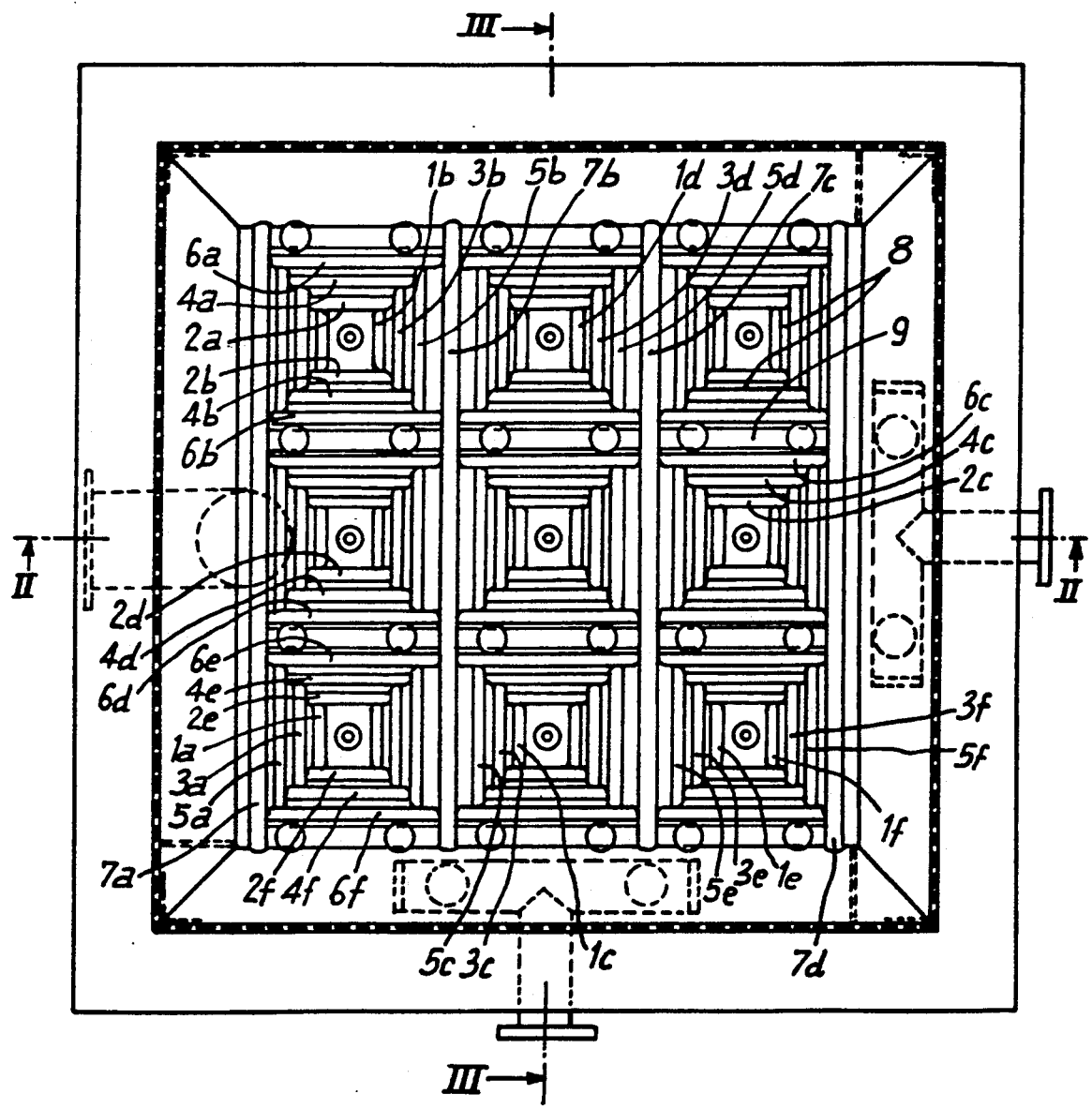
FIG. 1 is a plan view of a fluidization grid in accordance with the invention.
Figure 2:
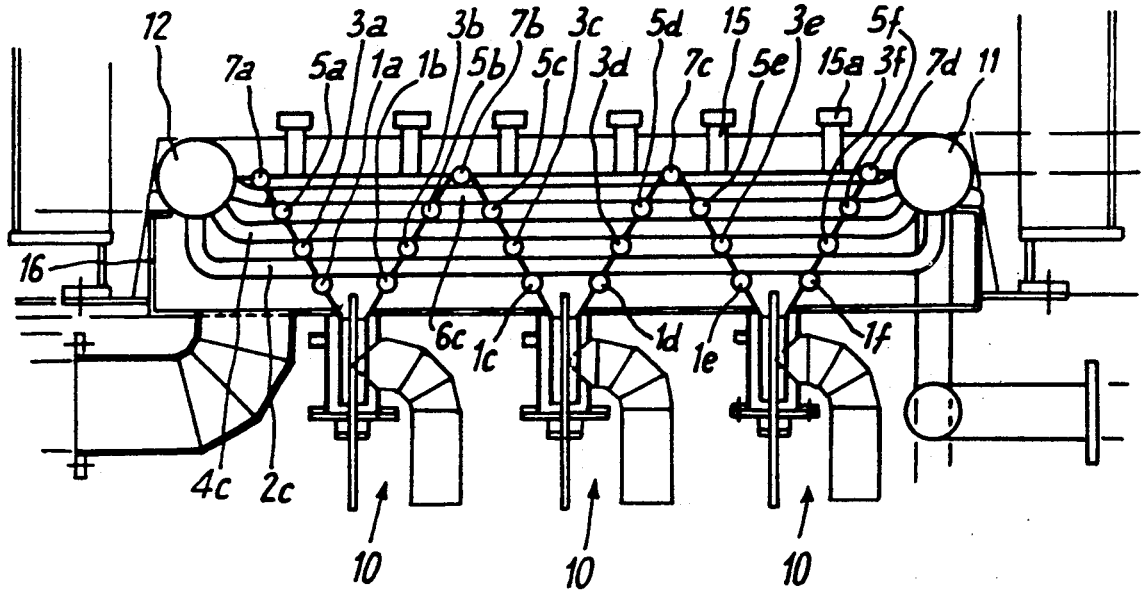
FIG. 2 is a section on line II—II of FIG. 1.
Figure 3:
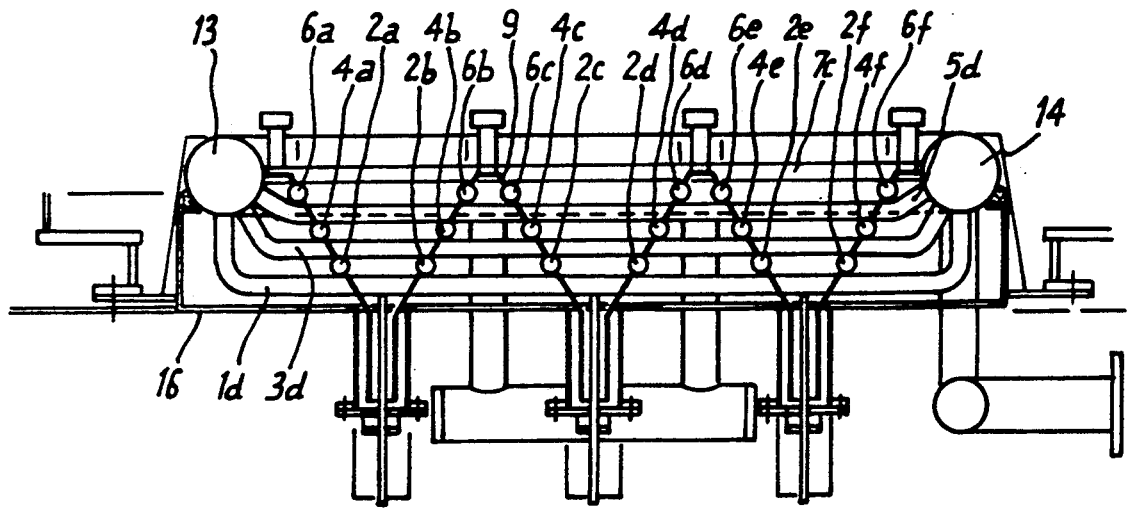
FIG. 3 is a section on line III—III of FIG. 1.

With reference initially to FIGS. 1 to 3, a fluidization grid in accordance with the invention comprises seven superposed layers of parallel tubes, with the layers crossing one another in succession at 90°. Thus, the bottom layer 1 includes pairs of pipes 1a, 1b, 1c, 1d, 1e, and 1f; with the tubes of each pair being spaced apart by a distance which defines the smallest dimension of the diverging openings of the grid. The second layer 2 comprises pairs of tubes 2a-2f, and is directed at 90° relative to the first layer. The distance between the tubes in each pair is a little larger than between the tubes in the first layer. In the third layer 3, the pairs of tubes 3a to 3f are parallel to those of the first layer 1, and the spacing between the tubes in each pair is further increased. Six first layers are built up in this way in which the tubes of each pair are further and further apart so as to define pyramid-shaped openings as can be seen in FIGS. 1 to 3. In the seventh or top layer, the tubes 7a to 7d are spaced apart as though adjacent tubes in adjacent pairs of tubes coincide to constitute single tubes.

At the walls of the openings, the pyramid-shaped structure of the grid is completed by sheet portions 8 which are welded to the tubes in diametrical planes thereof between their closest generator lines. Although the pyramid-shaped openings are lined in one direction by the tubes 7a to 7d, in the other direction they are spaced apart by metal strips 9 which are welded to adjacent tubes of consecutive pairs through which the additional fluidization air (or gas) may be admitted above the grid. The main air or gas admission is provided, in conventional manner, at the bottoms of the pyramid-shaped cells, by means of ducting 10.

Each tube in each layer has each of its ends connected to a distributing or a collecting manifold disposed at the periphery of the grid. In the example shown, cooling water arrives via manifold 11, after which it flows along the layers having even-numbered references in order to be collected by an intermediate manifold 12 from which it is directed to a manifold 13. Thereafter it flows along the layers having odd-numbered references and ends up in collection manifold 14.

After flowing through the grid and being collected, the water is transmitted to the heat exchange tubes which exist in fluidized bed boilers either within the bed itself or else along the walls of the hearth. The tubes of the fluidization grid may be directly connected to the tubes of the hearth without going beyond the scope of the invention.

The additional fluidization air passes through the walls 9 and is then injected over the grid by means of nozzles 15 from which it is blown either horizontally or else downwardly by means of deflectors 15a in order to be directed beneath the grid into a wind box or case 16 whose top wall is constituted by the grid.

FIGS. 4 and 5 are diagrams showing another embodiment of a grid in accordance with the invention which still has diverging openings 17 for the main admission of fluidizing air which is conveyed to the bases 17a of the openings. The wall of each of these openings is constituted by a helically wound pipe 18 (in this case around a conical surface) which is connected to a water supply manifold 19 at its base and to a water collecting manifold 20 disposed at the top surface of the grid. The reference surface around which the helical winding is formed may be any desired conical or pyramid-shaped surface. A weld fillet interconnects the contiguous turns in order to ensure that the wall is gas-tight. As in the preceding case, the manifolds 10 may directly constitute the heat exchange pipes of the boiler itself, in particular along the walls thereof. It may also be observed that the grid forms the top wall of a box 21 for feeding additional fluidizing air which opens out above the grid via openings 22a provided in the wall 22 interconnecting the conical cells level with their largest diameters. In a variant (not shown) the helical winding may have non-contiguous turns. In this case, a helical connection plate extends between adjacent turns.

FIGS. 6 and 7 show a variant of the preceding figures in which the helical pipes 18 are directly and individually extended by vertical tubes 23 forming the boiler tubes which are received vertically in the hearth. The other dispositions remain unchanged. This disposition is particularly advantageous since it makes it possible to install heat extraction tubes through the combustion core of a boiler, which tubes are vertical and are therefore much less subject to abrasion and erosion then are conventional tubes passing through the bed.

Figure 8:
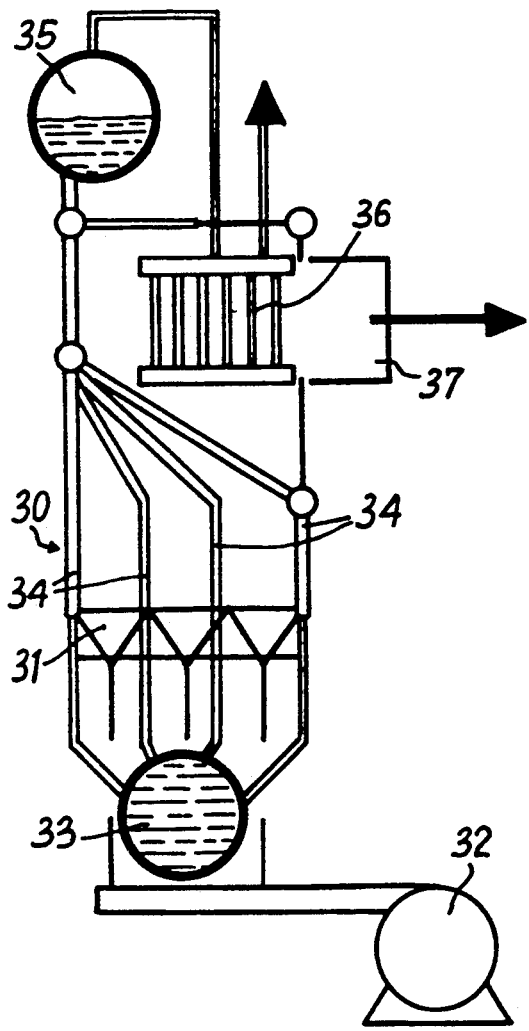
FIGS. 8 and 9 are diagrams of two boilers fitted with grids in accordance with the invention.

FIG. 8 is a diagram of a boiler 30 which makes use of a grid 31 in accordance with the invention. This boiler has an air-supply fan 32, a source of water 33 which feeds the pipes in the grid 31 and which subsequently flows directly along the tubes of the boiler 34 prior to reaching a water and steam collecting manifold 35 and passing through a superheater 36 situated in the duct 37 for collecting flue gases. In this figure, the boiler tubes are directly connected to the grid as shown in FIGS. 6 and 7, extending vertically from the end of each pipe 18.

Figure 9:
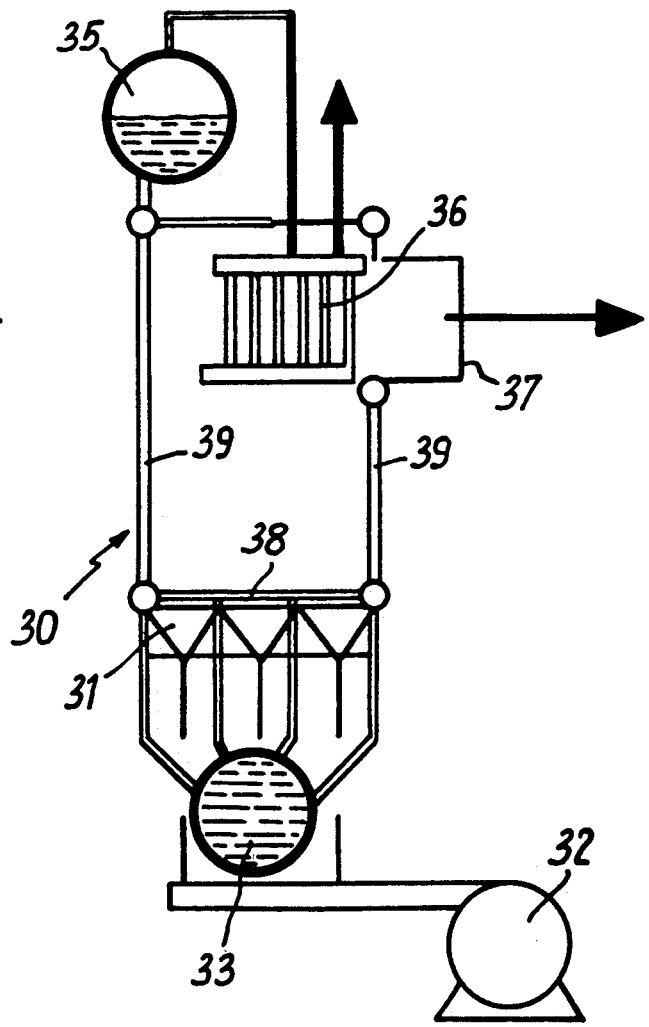

In contrast, FIG. 9 is a diagram of a grid 31 which includes manifolds 37 for collecting the water heated in the grid as shown in FIGS. 1 to 5, with tubes 39 running from the manifolds 37 along the walls of the boiler in order to reach the water and steam collecting manifold 35 and the superheater 36.

The invention serves above all to cool the grid effectively, thereby extending its length of life. It also serves to provide more effective extraction of the heat evolved during combustion. Since the walls of the diverging openings have their outside faces in contact with the additional fluidizing air present in the air supply box, this additional air is heated, thereby improving combustion. Finally, the control and regulation of the boiler are greatly improved by virtue of the grid being cooled.

The invention is advantageously applicable to producing energy.

We claim:

1. A grid for fluidizing a mass of finely divided material in a fluidized bed exothermal reactor, comprising:
    a top face and a bottom face and a plurality of openings defined therethrough from said bottom face to said top face for admitting a gas for sustaining the material which is disposed over the top face of the grid,
    said openings having walls diverging in the direction of the mass of material to be fluidized,
    the walls of each opening being defined at least in part by tubular members for conveying a cooling fluid, and
    superposed layers of parallel pairs of tubular members,
    the tubular members in each layer crossing the tubular members of a next adjacent layer,
    a spacing between pairs of tubular members in each layer increasing from said bottom face toward said top face,
    the tubular members of each layer defining a portion of opposing walls of at least one said opening.

2. A grid according to claim 1, wherein the tubular members of each layer cross the tubular members of a next adjacent layer at an angle of about 90°.

3. A grid according to claim 2, wherein the crossing layers of tubular members define openings having an inverted pyramid-shape and gaps between parallel tubes of different layers are connected by connection plates which are welded to and extend between adjacentmost portions of said parallel tubes of different layers.

4. A grid according to claim 1, wherein the top face is defined by a top layer of tubular members and wherein at least one of said tubular members of said top layer defines a top most edge of a side wall of two adjacent openings.

5. A grid according to claim 1, wherein each pair of parallel tubes is connected at each end thereof to a duct disposed at a top periphery of the grid.

6. A grid according to claim 5, wherein a distributing manifold duct is connected to upstream ends of one set of parallel tubes and a collecting manifold is connected to downstream ends of another set of parallel tubes, said one set of parallel tubes and said another set of parallel tubes being fluidly coupled so that fluid flows from said distributing manifold to said collecting manifold through both sets of tubular members in succession.